May 24, 1966 G. A. LUCCHI 3,253,278
PULSE CODE GENERATOR SYSTEM
Filed Dec. 2, 1963 9 Sheets-Sheet 1

INVENTORS:
GUELINO A. LUCCHI
BY Floyd M. Harris
Attorney

May 24, 1966 G. A. LUCCHI 3,253,278
PULSE CODE GENERATOR SYSTEM
Filed Dec. 2, 1963 9 Sheets-Sheet 5

INVENTOR.
GUELINO A. LUCCHI
BY
Floyd M. Harris
ATTORNEY

May 24, 1966          G. A. LUCCHI          3,253,278

PULSE CODE GENERATOR SYSTEM

Filed Dec. 2, 1963          9 Sheets-Sheet 6

INVENTOR.
GUELINO A. LUCCHI
BY
Floyd M. Harris
ATTORNEY

United States Patent Office 3,253,278
Patented May 24, 1966

3,253,278
PULSE CODE GENERATOR SYSTEM
Guelino A. Lucchi, San Fernando, Calif., assignor to Radio Corporation of America, a corporation of Delaware
Filed Dec. 2, 1963, Ser. No. 327,436
15 Claims. (Cl. 343—7.3)

My invention relates to an improved pulse code generating system and to Distance Measuring Equipment (DME) incorporating said pulse code generating system. While the pulse code generating system will be described as applied to Distance Measuring Equipment, its use is not limited to this particular application.

DME is airborne radar equipment of the pulse type which interrogates a selected ground beacon or transponder to initiate a reply. The interrogation is by a pulse code, usually comprising two pulses having a predetermined time spacing. The DME receives the reply from the beacon and gives the pilot a reading of the distance from the aircraft to the ground beacon. The reply also is in the form of a pulse code, usually comprising two pulses having a predetermined time spacing. The DME automatically searches in range by means of a range gate, and then locks in to automatic track-in-range upon reception of several reply pulses that are coincident in time with the range gate.

In DME systems it may be desirable to selectively employ different pulse codes for interrogation. For example, it may be desired at one time to interrogate certain ground stations with a pair of code pulses having a 12-microsecond time spacing, and at another time to interrogate other ground stations with a pair of code pulses having a 36-microsecond time spacing. The present invention provides an improved means for generating code pulses having any one of several time spacings that may be selected by an operator. As applied to DME, one of the advantages of this improved means is that once the DME is properly adjusted for operation with code pulses of one time spacing, it is properly adjusted for code pulses of any other selected code spacing.

In the specific embodiment of the invention that will be described by way of example, the DME includes a timing oscillator that supplies a constant amplitude sine wave signal. For the purpose of generating code pulses of a selected time spacing, this sine wave signal is applied to the inputs of several pulse generating channels which are adjusted to be triggered successively by the sine wave at adjustable times as a result of the negative half cycle of the sine wave falling below a selected negative value, which selected value is different for each channel. Thus, the time that a particular channel generates a pulse depends upon where on the slope of the negative half cycle that channel has been set to be triggered.

In the example to be described, the channel in which the first occurring of these pulses is generated includes a frequency divider or count-down generator for supplying pulses of the desired repetition frequency (PRF). These pulses of the desired PRF trigger a gate pulse which is of sufficient width to pass all pulses produced in the several channels during one cycle of the sine wave. A pulse having a certain timing will be gated through its channel by the gate pulse so that it also will, at the channel output, recur at the desired PRF. This is true of the output pulses of all the channels. Any one or more of these output pulses, each having a different timing, may be selected by a code selecting switch, this selection providing the desired interrogation pulse code.

In the present example, the last generated of the pulses (one occurring at zero crossover, for example) is employed as the time reference pulse for the DME, and is always included as one of the code pulses. The distance measurement is always made with respect to this reference pulse. In this example, a two-pulse code is employed. To produce this two-pulse code, any desired one of the earlier generated pulses is selected, depending upon the code spacing desired, for transmission with the time reference pulse.

The invention will be described in detail with reference to the accompanying drawings in which:

FIG. 7 is a schematic and block diagram of the module 1A11 of FIG. 1;

In the several figures like parts are indicated by similar reference characters.

In order that the invention as applied to DME will be understood, a DME will be described. The DME which will be described is of the general type often referred to as DMET (Distance Measuring Equipment, TACAN). It has assigned to it 126 transmitting channels and 126 receiving channels which are frequency separated. No specific description of the apparatus providing the separate channels is required because it is known.

As will be discussed later, in the DME here described there are four modes of operation, namely, (1) automatic track, (2) proportional memory, (3) automatic search, and (4) acquisition.

Figure 1:
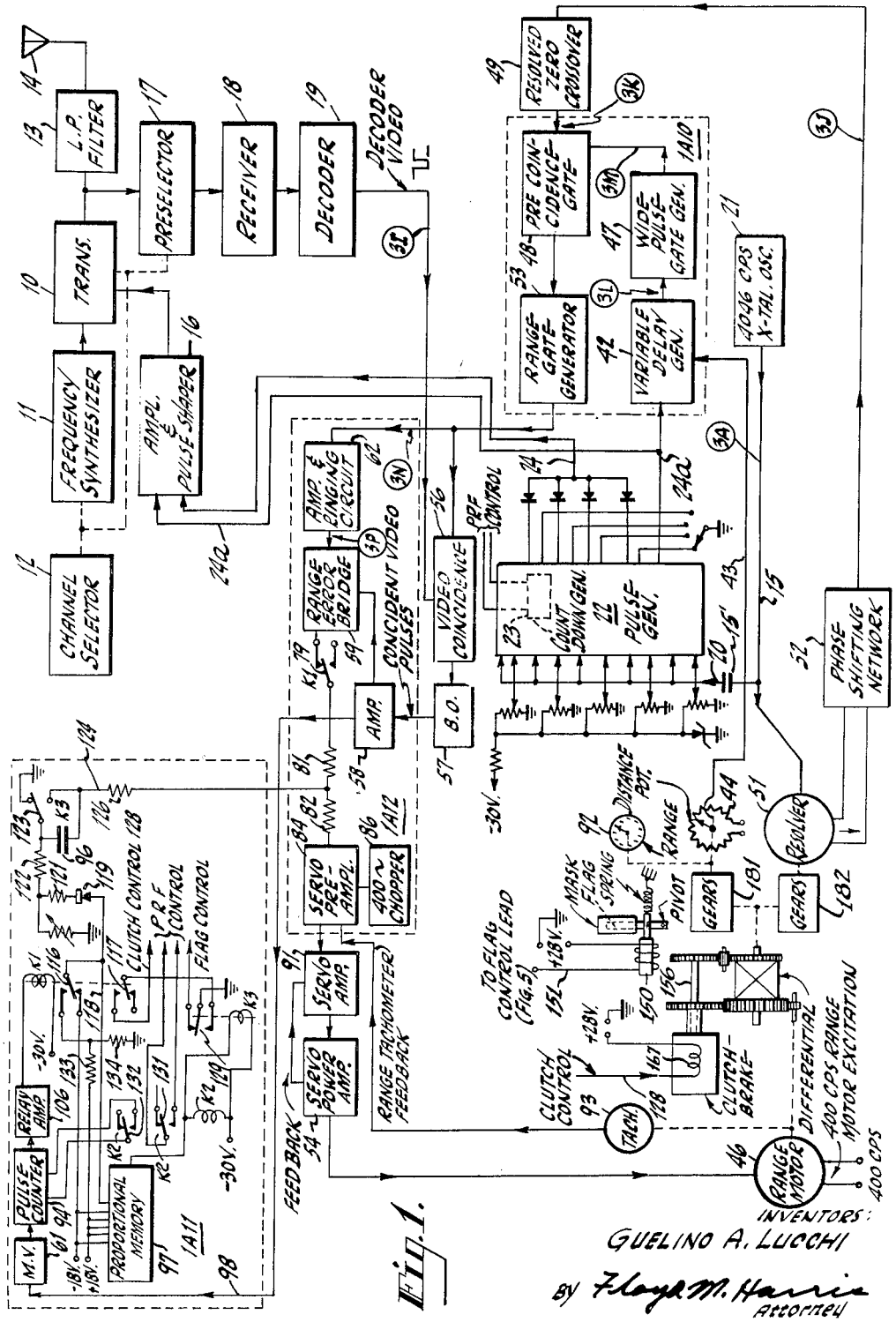
FIG. 1 is a block diagram illustrating one embodiment of the invention.

FIG. 1 is a block diagram of a DME in which my improved pulse code generating system is incorporated. The DME comprises a radio transmitter 10 comprising amplifiers to which a selected carrier wave is supplied from a frequency synthesizer 11. The desired carrier wave is selected by a suitable channel selector 12. The transmitter is coupled through a low-pass filter 13 to an antenna 14 which functions as both a transmitting and a receiving antenna. The low-pass filter 13 prevents the transmission of harmonics of the transmitter frequency. It also prevents possible spurious receiver responses at frequencies, for example, where the preselector has additional pass bands. The transmitter is modulated by periodically recurring pairs of code-spaced pulses supplied from an amplifier and pulse shaper 16 for interrogating the selected ground beacon.

Reply pulses from the ground beacon are received by antenna 14 and passed through the filter 13 to a preselector 17 which is tuned to receive reply pulses on the transmitting channel of the selected ground station. As indicated by the dotted lines, when the transmitter 10 is tuned to interrogate the selected ground station, the preselector is simultaneously tuned to the transmitting frequency of that ground station. The reply signal is passed from preselector 17 to a radio receiver 18. The demodulated reply signal appears at the output of receiver 18 as periodically recurring pairs of video pulses, there being a pair of reply pulses in response to each pair of interrogating pulses. The video pulses from receiver 18 are applied to a decoder 19 which decodes the pairs of pulses to produce a single pulse, referred to as decoder video, for each pair of applied pulses.

RANGE TIMING CIRCUIT

Reference is now made to the range timing circuit which comprises, in this example, a crystal controlled oscillator 21, operating 4046 cycles per second, which supplies a sine wave signal 3A of constant amplitude as shown in FIG. 3A. To insure a sine wave of constant amplitude either the oscillator 21 is amplitude controlled, or its output is passed through an amplitude limiter and then through a filter to regain the sine wave form. The oscillator 21 is part of the pulse code generator, one embodiment of which will now be described as applied to the DME.

Figure 2:
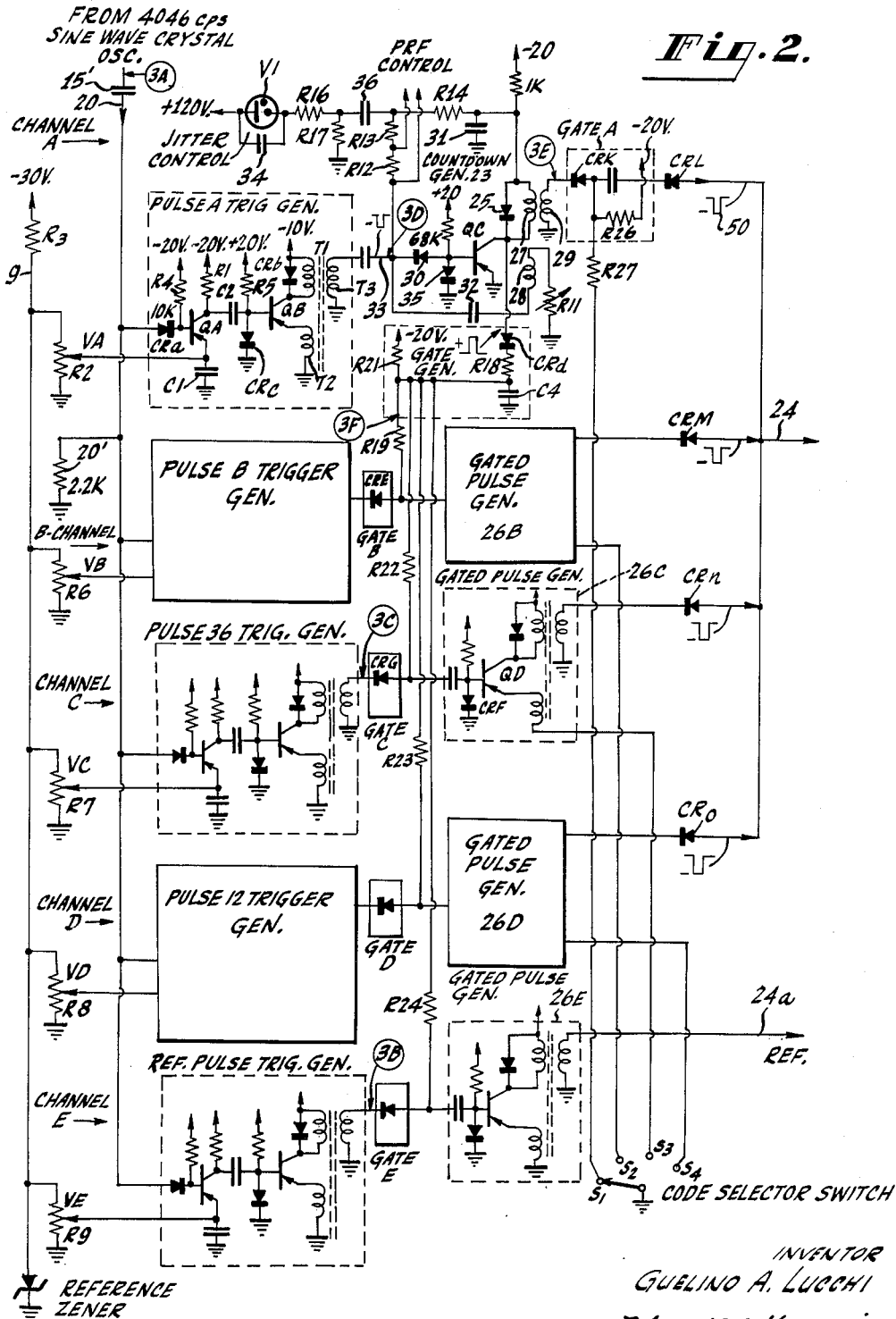
FIG. 2 is a schematic and block diagram of a pulse code generator embodying the invention.

The sine wave output of timing oscillator 21 is supplied over a lead 15, a coupling capacitor 15', and a lead 20 to the pulse generator shown by the block 22 in FIG. 1 and shown in the schematic and block diagram of FIG. 2. Refer to FIG. 2. In this example the pulse generator 22 comprises five channels A, B, C, D and E, each of which includes a pulse trigger generator. These pulse trigger generators are identical and are identified in channels A, B, C, D and E, respectively as pulse A trigger generator, pulse B trigger generator, pulse 36 trigger generator, pulse 12 trigger generator, and reference pulse trigger generator. The timing sine wave is applied to each of these trigger generators through a diode. The pulse A trigger generator will now be described, this description applying to the trigger generators in channels B, C, D and E also since they are the same although they are biased differently as will be described later.

The pulse A trigger generator comprises a transistor QA of the PNP type to the base of which the timing sine wave signal is applied through a diode CRa which is connected to pass current while the sine wave is positive with respect to the base of transistor QA. Minus 20 volts is applied through a resistor R1 to the collector of QA. The various voltage values given in describing the pulse generator are given by way of example.

The emitter of QA is connected to a variable tap on a potentiometer R2 connected between a bus 9 and ground. A bypass capacitor C1 is connected between the emitter of QA and ground. The voltage at the tap is referred to as a bias voltage and is indicated as having a value VA. A 30 volt source (not shown) has its negative terminal connected to the bus 9 through a resistor R3.

The positive terminal of the 30 volt source is connected to ground. The bus 9 is held at a constant potential by a zener diode, identified as the reference zener, connected between the bus 9 and ground.

In the absence of sine wave current passing through the diode CRa, the transistor QA is held in a saturated condition by minus 20 volts applied through a resistor R4 to its base.

The collector of QA is coupled through a differentiating capacitor C2 to the base of a transistor QB which comprises part of a blocking oscillator. The blocking oscillator further comprises a transformer having its primary winding T1 in the collector circuit of QB and its secondary winding T2 in the emitter circuit of QB. A tertiary output winding T3 is provided. A protective diode CRb is connected across the primary T1.

Transistor QB is held normally non-conducting by the positive voltage drop across a diode CRc applied to the base of QB. To obtain this voltage drop, plus 20 volts is applied to the anode of diode CRc through a resistor R5. Resistor R5 acts with capacitor C2 as a differentiating circuit.

The operation of the Pulse A Trigger Generator is now explained with reference to FIG. 5. Assume, for example, that by adjustment of the tap on potentiometer R2 the emitter of QA is at minus 5 volts with respect to ground. Also, assume that the sine wave voltage on lead 20 is 12.5 volts from zero to peak voltage. The sine wave crossover (zero volts) is effectively at ground potential due to the use of coupling capacitor 15' and the presence of the 2200-ohm resistor 20' connected between the lead 20 and ground. During the positive half cycle of this sine wave the diode CRa is conducting so that positive voltage is applied to the base of QA and it is cut off. During the first part of the negative half cycle QA is still cut off and remains so until the half cycle voltage reaches the negative voltage of the emitter (5 volts in this example). Now for the interval that the negative half cycle voltage is more minus than minus 5 volts, diode CRa is back biased and the transistor QA is in saturation. As a result, a pulse as shown at FIG. 5B appears at the collector of QA. This pulse is differentiated by C2, R5 so that the positive and negative pulses shown in FIG. 5C are applied to the base of the blocking oscillator transistor QB. The blocking oscillator is triggered by the negative pulses to produce the blocking oscillator negative output pulses 5D, shown in FIG. 5D, which are supplied from he tertiary winding T3. In channel A (FIG. 2), the pulses 5C correspond to the pulses shown at D in FIG. 3.

Figure 5:
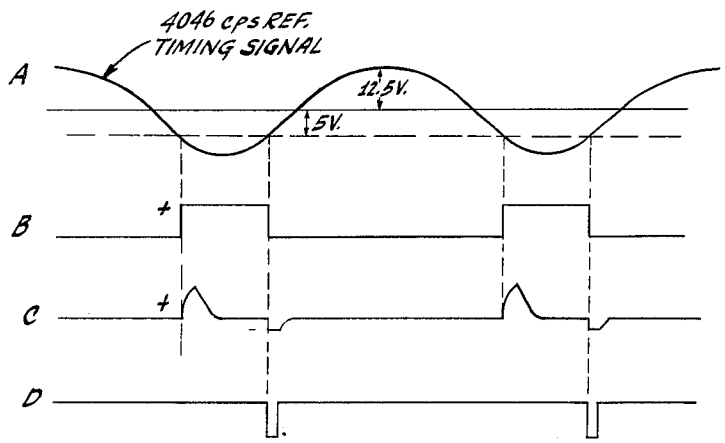
FIG. 5 is a group of graphs that are referred to in explaining the operation of the pulse code generator of FIG. 2.

From inspection of FIG. 5 it will be apparent that the timing of the blocking oscillator output pulses is determined by the voltage or bias at which the emitter of QA is set, this being 5 volts in the example of FIG. 5.

Figure 4:
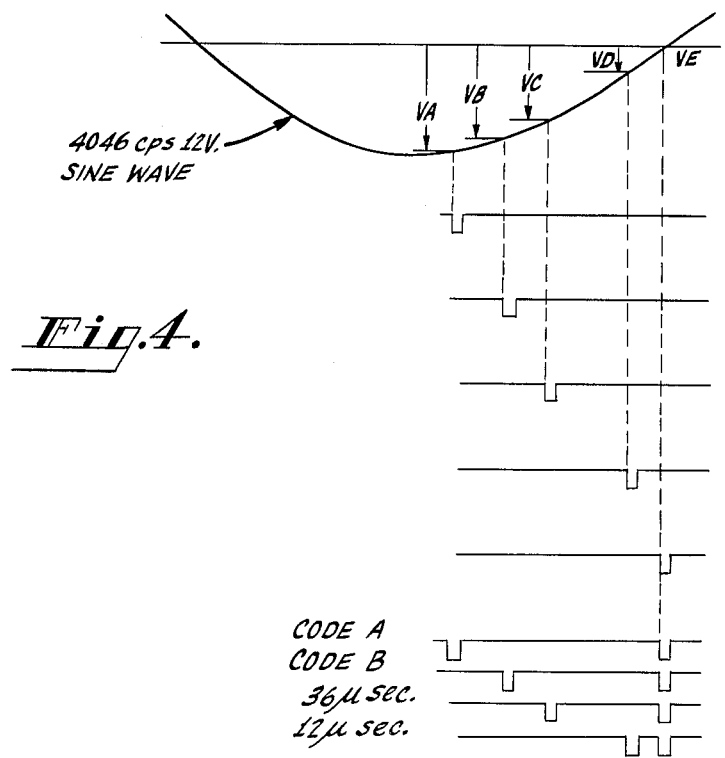
FIG. 4 is a group of graphs illustrating the timing relation between a timing sine wave and the generated code pulses.

The trigger generators in channels B, C, D and E are set at different bias voltages having values VB, VC, VD and VE. These bias voltages are taken off potentiometers R6, R7, R8 and R9. Like potentiometer R2, they are connected between the bus 9 and ground. FIG. 4 illustrates the output pulses of the trigger generators for certain bias settings. It will be noted that bias setting VD is for obtaining a pair of 12-microsecond spaced pulses, and that the bias VC gives a pair of 36 microsecond spaced pulses. Bias VA gives a "code A" spacing and bias VB gives a "code B" spacing.

It will be noted that the bias VE causes production of a pulse at zero crossover of the sine wave, and that this pulse is, in the example shown, used as the reference pulse, i.e., regardless of the pulse code selected, the second pulse is this reference pulse.

Figure 3:
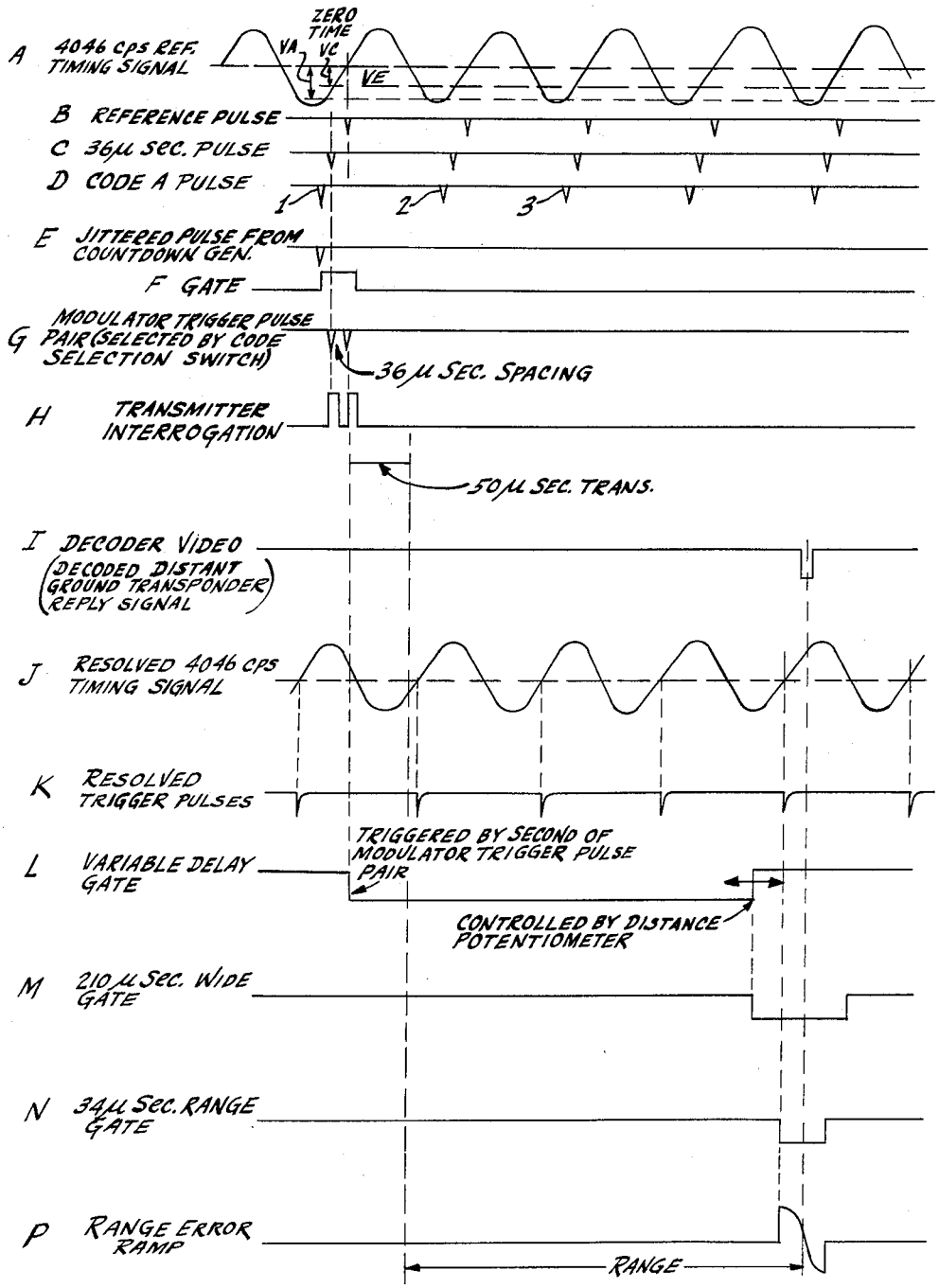
FIG. 3 is a range timing diagram for the apparatus of FIG. 1.

The reference pulse supplied from pulse generator 26E of channel E, and the 36 microseconds spaced pulse supplied from pulse generator 26C of channel C, correspond to the pulses shown at B and C, respectively, in FIG. 3.

From the foregoing description it is apparent that the trigger generators of the five channels produce successively occurring pulses (as shown in FIG. 4), there being five such pulses for each cycle of the 4046 c.p.s. sine wave. This is also illustrated in FIG. 3 where only three of the five pulses are illustrated in order to simplify the drawing, the three pulses illustrated being the reference pulse, the 36-microsecond pulse, and the Code A pulse.

In order to obtain pulses occurring at the desired repetition frequency (PRF), the desired PRF being either 140 c.p.s. or 30 c.p.s. in this example, channel A is provided with a count-down generator 23 which supplies Code A pulses of the desired PRF, and which also supplies gate pulses of the desired PRF.

The count-down generator 23 comprises a blocking oscillator which, in the example shown, comprises a transistor QC of the PNP type. The blocking oscillator transformer comprises a primary winding 27 in the collector circuit, a secondary winding 28 in the base circuit, and a tertiary output winding 29. Minus 20 volts is applied to the collector of QC through a 1000 ohm resistor and primary winding 27. A filter capacitor 31 and a protective diode 25 are provided. Secondary winding 28 has one end connected through an adjustable resistor R11 to ground. The other end of secondary 28, which is driven negative when the oscillator fires, is connected through a capacitor 32 and a diode 30 to the base of QC. The emitter of QC is connected to ground. When the blocking oscillator fires, current flows from emitter to base, through diode 30, capacitor 32, and secondary 28 to ground. Thus, at the end of the pulse capacitor 32 is charged and back biases diode 30. The negative trigger pulses being applied from T3 over a lead 33 cannot trigger the blocking oscillator until sufficient charge has leaked off capacitor 32 to sufficiently reduce the back bias on diode 30.

The leakage path for capacitor 32 is through resistors R12, R13, R14, through 1K resistor and the minus 20 volt power supply, to ground, and from ground through resistor R11 and secondary 28. The leakage rate, after initial adjustment, is determined by whether resistor R12 is shorted or remains effectively in the circuit. When shorted, the PRF is 140 pulses per second, when not shorted the PRF is 30 pulses per second. The PRF is controlled as will be described later.

It may be noted that the blocking oscillator of the count-down generator 23 is not free-running, i.e., it must be triggered since QC is normally biased to cut-off by the voltage drop across a diode 35 resulting from plus 20 volts connected to its anode through a 68K resistor.

The jitter control circuit is a free-running relaxation oscillator comprising a capacitor 34 connected at one side to plus 120 volts D.-C., and connected at the other side through resistors R16 and R17 to ground. The capacitor 34 is shunted by a neon lamp V1 which breaks down when capacitor 34 charges to a certain voltage. Thus, a low frequency (about 10 cycles per second) sawtooth voltage appears across resistor R17. This sawtooth voltage is coupled by a capacitor 36 to the discharge path of blocking oscillator capacitor 32, thus superimposing a wave in the PRF control RC network that jitters the PRF output of the count-down generator 23 by a few counts. The jittered output pulses 3E are shown at E in FIG. 3. This jitter is a discrete amount. For example, the count-down generator 23 may fire on Code A pulse 1 as shown in FIG. 3, or it may fire on Code A pulse 2, or on Code A pulse 3, these pulses also being identified as pulses 3D.

A gate pulse at the desired PRF is obtained by taking the output pulse off the collector of the count-down generator and supplying it through a diode CR$d$ and a resistor R18 to a pulse stretching capacitor C4. The resulting gate pulse 3F is indicated at F in FIG. 3. It will be seen that the gate pulse is initiated by the Code A pulse (the pulse from channel A), and that it has been stretched to last during the occurrence of the succeeding trigger pulses produced in channels B, C, D and E. It will be apparent that the gate pulse 3F is jittered the same as the pulse 3E since it is generated by the jittered pulses 3E.

The positive polarity gate pulse 3F is applied from C4 through an isolating resistor R19 to a Gate B which comprises a diode CRE. The Gate B couples the output of the pulse B trigger generator to a gated pulse generator 26B. The diode CRE is normally back biased by minus 20 volts applied through a resistor R21 and the resistor R19 to the anode of CRE so that trigger pulses can pass through Gate B and trigger pulse generator 26 only during the presence of the gate pulse. This is illustrated in FIG. 3G which represents a pair of 36 microsecond spaced pulses occurring at the PRF of the gate pulse, i.e., occurring at the desired PRF.

Channels B, C, D and E are alike except for the bias values VB, VC, VD and VE. The trigger generator of these channels has already been described since it is the same as the one in channel A. In addition to the trigger generator, each of these channels includes a gate and a gated pulse generator, but no count-down generator. The circuit of the gated pulse generator is shown in channels C and E. Referring to channel C, the gated pulse generator 26C is a blocking oscillator comprising a PNP type transistor QD. The oscillator is not free-running because QD normally is biased to cut-off by the voltage drop across a diode CRF.

The pulse 36 trigger generator is coupled to the gated pulse generator 26C through Gate C which comprises a diode CRG that normally is back biased. The gate pulse is applied to the anode of diode CRG through an isolating resistor R22. When the gate pulse is present, the 36 microsecond trigger pulse passes through Gate C and triggers the gated pulse generator. Thus a pulse appears at the tertiary output winding of the gated pulse generator 26C. This is the first occurring of the pair of pulses shown in FIG. 3G.

Similarily, the pulse 12 trigger generator is coupled to a gated pulse generator 26D through Gate D to which the gate pulse is applied through an isolating resistor R23. Likewise, the reference pulse trigger generator is coupled to a gated pulse generator 26E through Gate E to which the gate pulse is applied through an isolating resistor R24.

The negative output pulses from the count-down generator in channel A and from the gated pulse generators of channels B, C and D are supplied from the tertiary output windings through isolating diodes CRL, CRM, CR$n$ and CR$o$, respectively, to an output lead 24. Pulses supplied to the lead 24 are fed over the lead 24 (FIG. 1) to the amplifier and pulse shaper 16.

The negative output pulses from pulse generator 26E (the reference pulses) are supplied to a lead 24$a$. These pulses are fed by way of lead 24$a$ to the amplifier and pulse shaper 16 (FIG. 1). They are also fed to a variable delay generator 42 (FIG. 1) for purposes described later.

The amplifier and pulse shaper 16 may include a pulse shaper of the known type comprising two line-type pulsers connected to the same load. An example of such a pulser is described on pages 485 and 486 of the Radiation Laboratory Series, vol. 5, entitled, "Pulse Generators." In this example, the two pulse-forming networks of the two pulsers are each discharged through a thryatron. In the amplifier and pulse shaper 16, assuming it includes this particular pulser as the pulse shaper, one thryatron is triggered by the pulses fed over line 24, and the other thyratron is triggered by the pulses fed over line 24$a$.

In the present example a two-pulse code is used for the interrogating transmission. Therefore, of the five pulses supplied from channels A, B, C, D and E only two are selected for application to the output leads 24 and 24$a$. One of these two is always the pulse from channel E, this being the reference pulse that occurs at zero crossover of the timing sine wave as shown in FIG. 3 in the present example. The other of the two pulses is selected from one of the other channels by means of a code selector switch, shown at the bottom of FIG. 2, which may be set to ground any one of four leads.

The pulse selection from channels B, C and D is accomplished in a manner that will be understood by referring to the gated pulse generator 26C in channel C. Note that the transformer secondary winding is connected between the emitter of QD and one of the code selector switch contact points identified as S3. Unless this contact point S3 is connected to ground, the pulse generator 26C cannot be triggered by a trigger pulse. Therefore, if the pulse from channel C is the selected pulse, as shown in the example of FIG. 3G, the code selector switch arm is set on contact point S3 so that generator 26C will be triggered and will supply a negative pulse through the isolating diode CR$n$ to the output lead 24. Thus, pulses appear on lead 24 which have a code spacing of 36 microseconds with respect to the reference pulses appearing on lead 24$a$. With the code selector switch arm set on contact S4 the code pulses are spaced 12 microseconds apart. With the switch arm on contact S2, the two pulses have the Code B spacing illustrated in FIG. 4. With the switch arm on contact S1, the pulses have the Code A spacing.

Figure 10:
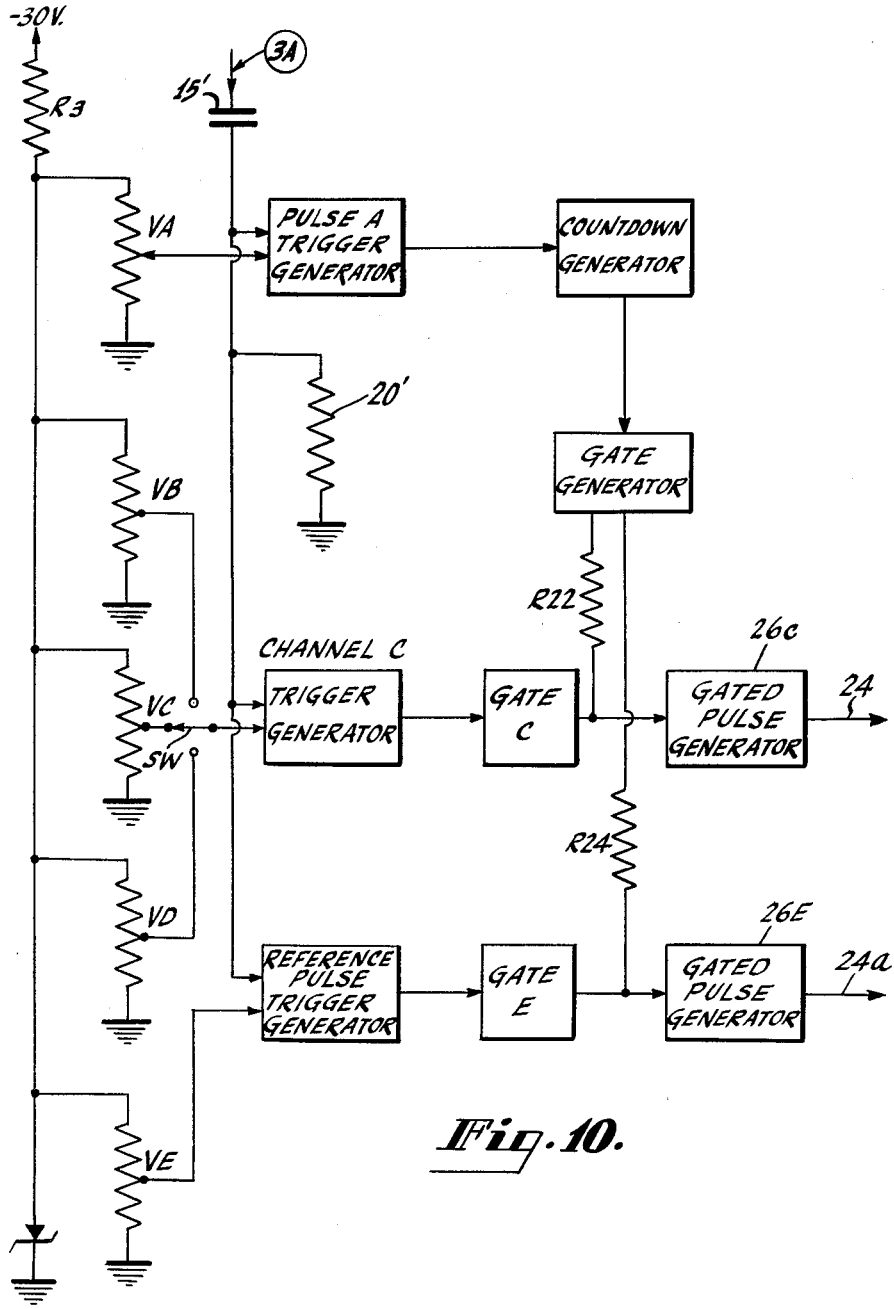
FIGS. 10 and 11 are schematic and block diagrams of simplified pulse code generators embodying the invention.

In the case where only a two-pulse code is to be produced, it may be preferred to simplify the pulse generator by selectively applying different biases to a single channel instead of applying each bias to its own channel. For example, in FIG. 2 the trigger generator, the gate and the gated pulse generator of channels B and D might be omitted and only the complete circuitry of channel C used with switching means to apply to it, as desired, either the bias VB, or the bias VC or the bias VD. In this example, channel C supplies either the code B pulse, the 36-microsecond spaced pulse, or the 12-microsecond spaced pulse. A pulse generator simplified in this manner is illustrated in FIG. 10. In this particular example, the channel which includes the countdown generator is employed only for generating the gate pulse. The desired code spacing is selected by turning the switch SW to apply the desired one of the three biases VB, VC or VD to the trigger generator.

Figure 11:
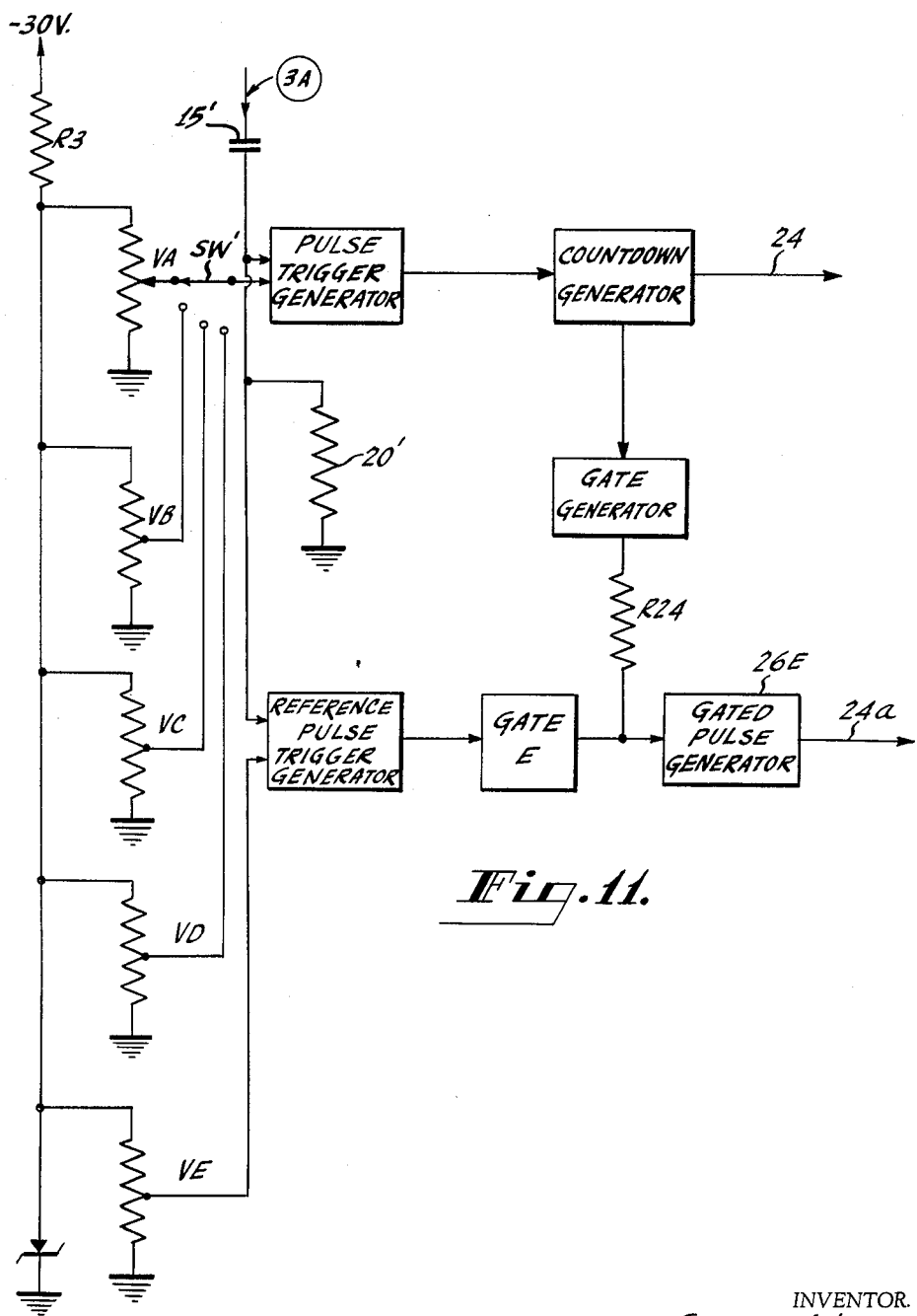

A further simplification for two-pulse code production is illustrated in FIG. 11. Here the channel which includes the countdown generator is employed for generating both a gate pulse and a code pulse as in example of FIG. 2. The code pulse, which is supplied to lead 24 of FIG. 11, may be made to occur at the correct time for the desired code spacing by selecting the position of a switch SW'. The desired code spacing is selected by turning the switch SW' to apply the desired one of four biases VA, VB, VC or VD to the trigger generator.

The means for selecting the pulse from channel A for the Code A spacing comprises a Gate A to which the output of the countdown generator is applied. Gate A comprises a diode CRK which normally is back biased by minus 20 volts applied to its anode through a voltage divider resistor R26. The voltage divider includes another resistor R27 which is connected through a lead to the contact S1 of the code selector switch. When the arm of this switch is set on contact S1, current flows through voltage divider R26, R27 so that the back bias voltage on CRK is reduced to a value that permits the negative pulses from the countdown generator to pass through Gate A. Therefore, with the code selector switch in the position illustrated, the pulses supplied to the lead 24 are spaced with respect to the reference pulses on lead 24a to have the Code A spacing.

From the foregoing it will be evident that the code spacing for the interrogation pulses may be selected as desired. It will also be evident that the range reading is not changed by a change in the code spacing because the time measurement is made with respect to the reference pulse which is always transmitted. This is illustrated in FIG. 3 which shows range measured from the second transmitter interrogation pulse (which was initiated by the reference pulse), the ground station or transponder delay of 50 microseconds being subtracted since it is a fixed delay added to the pulse transit time.

The present disclosure may be applied generally to the generation of multi-pulse codes. For example, selected three-pulse codes may be obtained by employing a code selector switch (bottom FIG. 2) having a switch arm that grounds two of the contact points S1, S2, S3 and S4. The switch arm might be designed to ground any two successive contact points, such as S1 and S2; or it might be designed to ground S1 and S3 in one position, and S2 and S4 in the other position. If desired, a digital code wheel may be employed as the code selector switch for selecting different codes.

TRACK AND SEARCH CIRCUITRY

Reference is now made more particularly to the automatic track-in-range and automatic search-in-range circuitry of the DME. As previously stated, the modulator trigger pulses are supplied to the amplifier and pulse shaper 16. The second occurring of the trigger pulse is also supplied, referring to FIG. 1, to the variable delay generator 42 which is included in a module 1A10, the units of which are enclosed by dotted lines. The unit 42 may be a phantastron or the like which produces a gate pulse having a back edge which may be varied in timing as a function of an applied D.-C. voltage. This variable delay gate pulse is shown in FIG. 3L. It is triggered or started by the first pulse of the modulator trigger pulse pair (FIG. 3G); it terminates at a time that is a function of the D.-C. voltage supplied over a lead 43 from the distance potentiometer 44. The potentiometer 44 is driven by the range motor 46 through a clutch-brake unit and gears as will be described later.

The back edge of the variable delay pulse from generator 42 triggers a wide pulse gate generator 47 which may be a monostable multivibrator. The output of generator 47 is the 210-microsecond wide gate pulse 3M shown in FIG. 3M. This wide gate is applied to a pre-coincidence gate 48 for periodically gating through resolved trigger pulses 3K (shown in FIG. 3K) supplied from a zero crossover circuit 49. The zero crossover circuit may be any one of several suitable types well known in the art. One such type comprises limiters for squaring the sine wave, a differentiator for producing a pulse of positive polarity at the start (zero crossover) of one-half cycle of the square wave, and a blocking oscillator that is triggered by this positive pulse. The pre-coincidence gate 48 may be a coincidence circuit of any suitable type, such as a coincidence diode circuit.

The resolved trigger pulses 3K (FIG. 3K) are obtained as follows: The sine wave signal from timing oscillator 21 is supplied to the rotor of a resolver 51 which is driven, together with the distance potentiometer 44, by the range motor 46 through the clutch-brake unit and gears. Two out-of-phase output signals are obtained from the resolver stator windings. These output signals are supplied to a phase shifting network 52 in which they are added to produce a single phase-shifted sine wave signal, shown in FIG. 3J, which is phase shifted by an amount that is a function of the position of the resolver rotor. This signal is referred to as the resolved timing signal 3J.

The timing signal 3J is fed to the zero crossover circuit 49. Thus, the output of unit 49 is the resolved trigger pulses 3K (FIG. 3K).

Referring again to pre-coincidence gate 48, the resolved trigger pulse of the pulses 3K that is coincident with the wide gate pulse 3M is passed by the gate 48. It is evident that the pulse repetition frequency (PRF) of the pulse output of gate 48 is the same as that of the modulator trigger pulses 3G.

The output pulses of gate 48 are applied to a range gate generator 53 which may be a monostable multivibrator that is triggered by the applied pulses to produce a range gate pulse 3N as shown in FIG. 3N. In the present example, the range gate pulse is 34 microseconds wide. It will now be evident that the time of occurrence of the range gate pulse 3N with respect to the pair of modulator trigger pulses 3G is a function of the positions of the distance potentiometer 44 and the resolver 51 as set by the range motor 46.

The range motor 46 is driven by a servo power amplifier 54 under the control of a range error signal when the DME is in the acquisition and automatic-track-in-range modes, which is under the control of a velocity memory voltage when the DME is in the memory mode, and which is under the control of a search signal when the DME is in automatic search.

The range error signal is obtained as follows. The range gate pulses 3N are applied to a coincidence circuit 56 which may be of the type comprising diodes. Also, the decoder video pulses 3I, shown in FIG. 3I, are supplied from the decoder 19 to coincidence circuit 56. When a decoder video pulse is in time coincidence with the range gate pulse 3N as illustrated in FIG. 3, the decoder video pulse passes through the coincidence circuit 56 and is applied to a blocking oscillator 57 to trigger it so that it produces one output pulse for each applied trigger pulse 3I. These output pulses, which are 4 microseconds in width, are referred to as coincident video pulses. They are applied to an amplifier 58 (in module 1A12) which supplies the coincident video pulses as 36 volt pulses to a range error bridge 59 (also in module 1A12), and as 8 volt pulses to a multivibrator 61 in a module 1A11.

As noted above, the amplifier 58 and the bridge 59 are included in a module 1A12 as indicated by the enclosing dotted lines. This module also includes an amplifier and ringing circuit 62 which applies a range error ramp 3P, as shown in FIG. 3P, in the form of an S wave to the range error bridge 59. The ramp 3P is generated by the range gate 3N supplied from generator 53, and is time coincident with it. Therefore, the video coincident pulses will be coincident with some portion of the range ramp to produce a range error signal unless the coincidence occurs at the center or zero crossover of the ramp, in which case there is no error signal.

Figure 6:
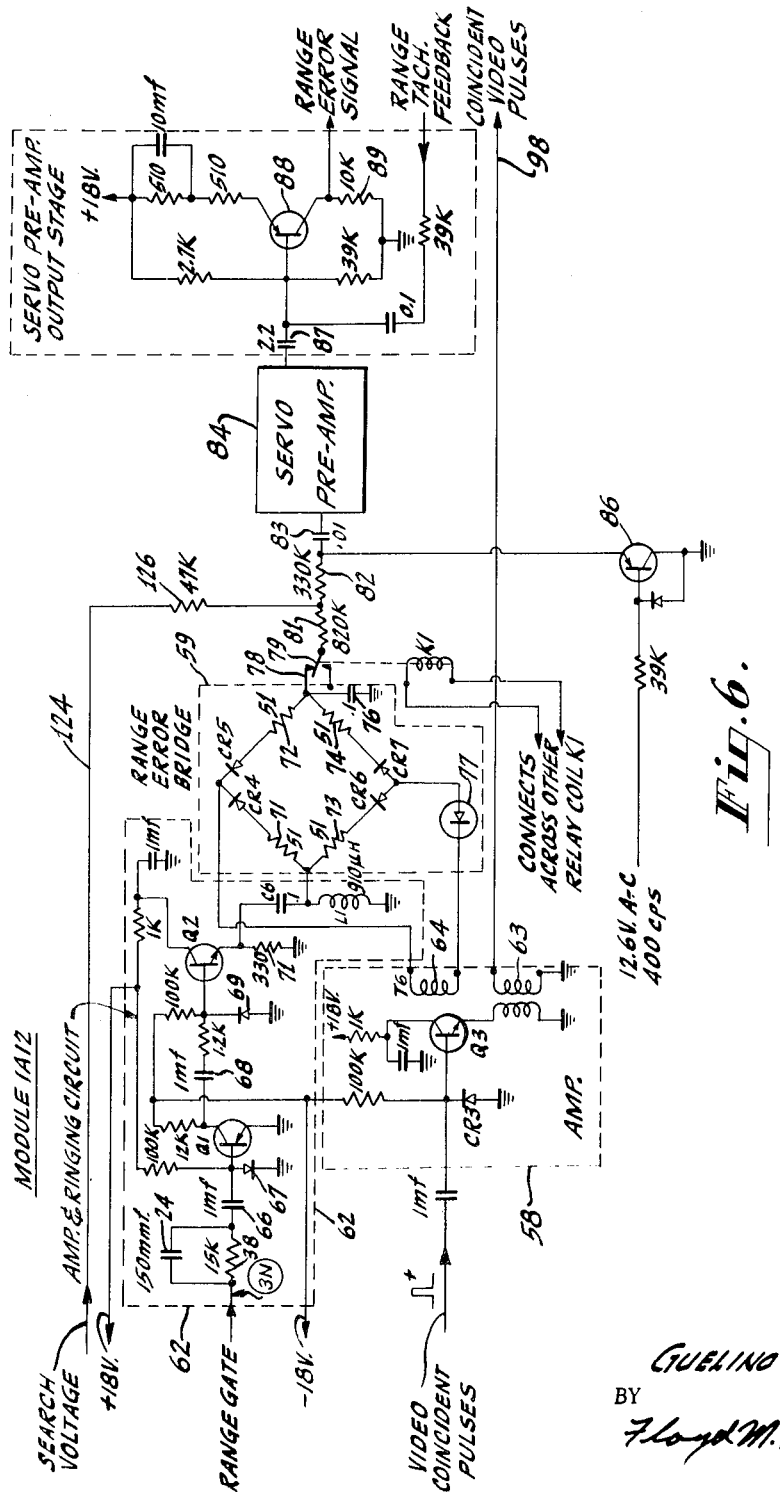
FIG. 6 is a schematic and block diagram of the module 1A12 of FIG. 1.

FIG. 6 shows units of module 1A12 in more detail by way of example. The amplifier 58 comprises an NPN type transistor Q3 which is normally reverse-biased by the voltage drop across a clamping diode CR3. The primary of an output transformer T6 is connected between the emitter of Q3 and ground. Transformer T6 has two secondaries 63 and 64. Upon occurrence of a coincidence video pulse, Q3 conducts to induce coincidence video pulses in the secondaries 63 and 64. The pulses from secondary 64 are applied across the range error bridge as will be described later.

The range gate 3N is applied to the amplifier and ringing circuit 62 which comprises a PNP type transistor Q1 and an NPN type transistor Q2. The range gate is applied with negative polarity through a coupling capacitor 66 to the base of Q1. Preferably, the coupling capacitor 66 is preceded by a capacitor 24 which, with the load at Q1, functions as a differentiating circuit to steepen the rise of the range gate. A resistor 38 shunts the capacitor 24 for passing the mid-portion of the range gate. Q1 is normally reverse-biased by the voltage drop across a clamping diode 67. During the application of the range gate, Q1 is forced into saturation thus producing a positive 18 volt pulse output at the collector of Q1. This output is applied through a coupling capacitor 68 and transistor Q2 to the ringing circuit which comprises a capacitor C6 and an inductance coil L1. Q2 functions as an emitter-follower driving the series resonant circuit C6, L1. Q2 is normally reverse-biased by the voltage drop across a clamping diode 69.

During the period that Q2 is applying the range gate to the ringing circuit C6, L1, one cycle of a sinusoidal ramp voltage is produced by an interchange of energy between L1 and C6 to produce the range error ramp 3P. The oscillation is terminated when the range gate signal terminates, cutting off Q2. The ramp voltage 3P is applied across one diagonal of the range error bridge 59.

The bridge 59 has a resistor and a diode in each of its four arms, the four arms containing, respectively, resistor 71 and diode CR4, resistor 72 and diode CR5, resistor 73 and diode CR6, and resistor 74 and CR7. The ramp voltage is applied to the bridge by a connection from the high voltage end of L1 to the junction of resistors 71 and 73, and by a connection from the other end of L1 through ground and through a storage or range error capacitor 76 to the junction of resistors 72 and 74.

The video coincident pulses induced in secondary 64 are connected across the other diagonal of the bridge 59, the upper end of secondary 64 being connected to the junction point of diodes CR4 and CR5, and the lower end of secondary 64 being connected through a 24-volt Zener diode 77 to the junction point of diodes CR6 and CR7. The Zener diode 77 acts as a threshold circuit to pass only signals above a certain voltage level and thus eliminate the lower voltage noise. Also, it maintains the current flow at a constant value since the input impedance (at secondary 64) is high. During the presence of each 36-volt, 4-microsecond pulse supplied from secondary 64, all four arms of the bridge are conducting. Therefore, during this 4-microsecond interval the ramp voltage 3P (of 34 microseconds duration) is sampled to charge or discharge capacitor 76 if the sampling occurs at one side or the other of the ramp zero crossover. If the 4-microsecond video coincident pulse is time coincident with the ramp zero crossover, the charge on storage capacitor 76 remains unchanged.

From the above it will be seen that the polarity and amplitude of the voltage built up on capacitor 76 is a function of the position of the 4-microsecond video coincident pulse inside the 34-microsecond range gate. This video coincident pulse, it will be remembered, is generated in response to a ground beacon reply, and its timing corresponds to the time of receipt of said reply. Thus, if the video coincident pulse is centered on the ramp 3P (and thus centered in the range gate 3N) the timing of the range gate with respect to the time of transmission of a pair of interrogation pulses gives the desired range information. Therefore, the output voltage from capacitor 76 is used as the range error signal to control the operation of the range servo system.

The range error signal from capacitor 76 is supplied to the upper contact 78 of a relay K1, and to a relay arm 79 when it is in its upper position (K1 deenergized). From relay arm 79, the range error signal is supplied through the resistor 81 of a lag-lead circuit, described later, and through resistor 82 and a coupling capacitor 83 to a servo pre-amplifier 84 of high input impedance. The error signal is chopped by grounding the junction point of resistor 82 and capacitor 83 at a 400-cycle per second rate. This is done by applying a 400-cycle per second signal to the base of a transistor 86 which, when driven to conduction, connects the output of the lag-lead circuit to ground.

Amplified range error signal is applied through a blocking capacitor 87 to the base of a transistor 88 which is the output stage of the pre-amplifier. The range error output signal is taken off the collector output resistor 89 and supplied, as shown in FIG. 1, to a servo amplifier 91 which drives the range motor 46 through the servo push-pull power amplifier 54. The motor 46 is a conventional A.-C. operated reversible servo motor. The servo amplifiers and feedbacks are conventional. To provide servo stabilization, tachometer feedback voltage is supplied from a tachometer 93 to the servo pre-amplifier as indicated. This feedback is proportional to the rate of rotation of the range motor. The tachometer feedback also serves to maximize the range velocity ratio.

It will be apparent that the range motor 46 is driven in one direction or the other depending upon the polarity of the range error signal, and that it is stopped if the range error signal becomes zero. Thus, when the DME locks in on a ground beacon reply, the range gate is driven to keep it coincidental in time with the reply pulse, i.e., the DME automatically tracks in range, and the angular position of the distance potentiometer shaft indicates the range which may be read off a range indicator 92 comprising, for example, a range dial and pointer.

MODE SWITCHING

The search-track control circuit in module 1A11 switches the DME from one mode of operation to another. As previously stated, there are four modes of operation which are: (1) automatic track-in-range, (2) proportional memory, (3) automatic search-in-range, and (4) acquisition. From acquisition the DME goes to automatic track-in-range, or back to automatic search. To explain these modes briefly, the DME is in mode 1 (automatic track) when a sufficiently strong reply signal is being received and the DME is locked in and indicating range; it is in mode 2 (memory) for a period up to possibly ten seconds in response to fading of the reply signals and still indicating range; it goes into mode 3 (automatic search)

if the fading or loss of reply signals lasts longer than the proportional memory period; it goes into mode 4 (acquisition) upon return of strong reply pulses, and unless they fade again promptly, it next returns to mode 1.

The module 1A11, referring to FIGS. 1 and 7, includes the relay K1 which is under the control of a pulse counter 94. It includes a velocity memory capacitor 96 which is also part of the lag-lead circuit. It includes a proportional memory circuit 97 which controls relays K2 and K3.

The operation and circuitry of the search-track control circuit of module 1A11 will now be described with reference to FIGS. 1 and 7. In FIG. 7, and also in FIGS. 2 and 6, some of the circuit values are given by way of example. Unless otherwise indicated, the values are in ohms, thousands of ohms (k) megohms (MEG), microfarads, micro-microfarads (mmf.), and microhenries ($\mu$h.). The video coincidence pulses (which correspond to reply pulses) are supplied from the amplifier 58 of module 1A12 over a lead 98 to the multivibrator 61 of module 1A11 which is of a conventional monostable type comprising transistors Q11 and Q12. Each 8-volt 4-microsecond video coincidence pulse triggers multivibrator 61 to produce a negative 7-volt 1.5-millisecond width pulse which is applied to the base of an emitter follower transistor Q13 of the PNP type in the pulse counter 94. With Q13 conducting during the 1.5-millisecond pulse input, the Q13 emitter is driven negative and a capacitor 99 is charged through a diode 101 and the emitter of a transistor Q14 of the NPN type. This charge path is from plus 12 volts applied to the collector of Q14, through Q14, diode 101, capacitor 99, output resistor 102 and Q13. During this time a diode 103 remains reverse biased.

As soon as Q13 turns off and its emitter returns to ground potential, diode 101 becomes reverse biased and diode 103 becomes forward biased. This allows a portion of the charge stored by capacitor 99 to be transferred to a storage capacitor 104. This charge transfer path is from the positive side of capacitor 99, through diode 103, through storage capacitor 104 to the minus 12 volt supply applied to the collector of Q13, through the minus 12 volt supply to ground, and from ground through the output resistor 102 to the other side of capacitor 99.

Each successive coincident video pulse turns Q13 on and allows additional charge to be transferred from capacitor 99 to storage capacitor 104 after Q13 turns off. Thus, the voltage across capacitor 104 builds up in steps, one step for each coincident video pulse. The voltage build-up across capacitor 104 raises the base potential of Q14, and Q14 is forced to conduct harder. The receipt by the DME of three or four good amplitude ground beacon reply signals out of nine or ten in succession will raise the voltage of storage capacitor 104 to a value which drives the emitter of Q14 positive enough to de-energize the relay K1. This action takes place as follows. The relay coil of K1 normally has collector current flowing through it from a PNP type transistor Q15 comprising relay amplifier 106, Q15 being forward biased by the minus 12 volt supply applied through a resistor 107. When Q14 conducts hard enough, its emitter becomes sufficiently positive to make a diode 108 conduct, thus applying positive voltage to the base of Q15 and turning off Q15 to de-energize K1. It will be noted that diode 108 is back biased by the minus 12 volt supply applied through the 24k resistor so that it normally is non-conducting.

Considering further the operation of pulse counter 94, the rate of voltage buildup on storage capacitor 104, and thus the potential buildup on the base of Q14, is controlled by the amount of resistance in the discharge path of capacitor 104. This discharge path is from the plus side of capacitor 104 through resistors 111, 112 and 113 to ground, and from ground through the minus 12 volt power supply back to the negative side of capacitor 104. The RC time constant of the discharge path is made shorter during the search mode by shorting the resistor 112 through contacts of relay K2 as described later.

Consider now certain functions performed by relay K1, again referring to FIGS. 1 and 7. In these figures, and in FIG. 6, the relay K1 is illustrated as de-energized; relays K2 and K3 are also shown de-energized; and the DME is in the automatic track-in-range mode. It will be noted that the two K1 relay coils shown in FIGS. 6 and 7, respectively, are connected in parallel, the K1 coil in FIG. 6 controlling relay arm 79. With K1 de-energized, range error signal is applied through arm 79 to the servo pre-amplifier 84, and the DME is tracking in range.

As shown in FIGS. 1 and 7, with K1 de-energized, its arms 116 and 117 are in their lower position where 117 connects to an open circuit and arm 116 connects to a minus 18-volt supply. This minus 18 volts is now connected through a lead 118 to the proportional memory circuit 97 as will be discussed later. For applying a search voltage to the servo pre-amplifier 84 when K1 is energized, the relay arm 116 is also connected through a diode 119 and resistors 121 and 122 to the relay arm 123 of relay K3. This arm connects to ground when K3 is de-energized, as in the illustrated track mode, and connects to a lead 124 when K3 is energized, thus applying a search voltage to lead 124, and also shorting velocity memory capacitor 96. The level of the search voltage is controlled by a variable resistor 127 which together with resistor 121 acts as a voltage divider. The search voltage is supplied, during the search mode, over lead 124 and, referring to FIGS. 1 and 6, through a resistor 126 to the junction point of resistor 81 of the lag-lead network and resistor 82. The lag-lead network comprises resistors 81, 126 and capacitor 96.

During the track mode the velocity memory capacitor 96 is charged by the range error voltage supplied from the range error capacitor 76 (FIG. 6). This error signal is fed through resistors 81 and 126, lead 124 to velocity memory capacitor 96, and through relay arm 123 to ground. As a part of the lag-lead network, capacitor 96 stores the time integral of range error. The greater the velocity of the airborne DME with respect to a ground station, the greater the range error voltage, and the greater the charging voltage applied to the velocity memory capacitor 96.

It should now be noted that the complete lag-lead network consists of the resistors 81 and 126 (FIG. 6) and the velocity memory capacitor 96 (FIG. 7), capacitor 96 actually performing two functions. The lag-lead network when in the circuit causes the servo to have a comparatively slow response, and be non-responsive to noise. The servo response is fast when capacitor 96 is shorted by relay arm 123 with greater acceleration capability; it is comparatively slow when capacitor 96 is not shorted.

The range gate is driven comparatively fast for search and comparatively slow for track as determined by the clutch-brake unit and gearing mechanism. This slow or fast drive is under the control of relay K1 in cooperation with relay K3 as indicated in FIGS. 1 and 7. The clutch-brake unit, in effect, shifts gears for fast or slow drive, the set of gears through which the range motor 46 is driving depending upon whether a clutch control lead 128 is grounded or ungrounded as described in detail later. With DME in the track mode, K1, K2 and K3 being de-energized as illustrated, arm 117 of K1 is disconnected from clutch control lead 128 and the lead is ungrounded. Thus, the range motor 46 is driving the distance potentiometer 44 and resolver 51 through the slow driving gear train.

When K1 is energized, as in the search mode, and providing K3 is energized, as it is in the search mode, the clutch control lead 128 is connected to ground by way of K1 arm 117 and the arm 129 of relay K3. Thus, the clutch has been actuated so that the range motor 46 is now driving through the fast driving gear train.

From the foregoing it will be noted that relay K3 functions for clutch-brake control by action of its arm 129, and that it also functions at the velocity memory capacitor 96 by action of its arm 123 for either shorting the memory capacitor or connecting its upper side to ground. Both relay K3 and relay K2 are controlled by the proportional memory circuit 97. Relay K2 performs two functions. The position of its arm 131 determines the pulse repetition frequency (PRF) of the transmitted interrogation pulses, the PRF being higher during the search mode than during the track mode; and the position of its arm 132 determines whether or not resistor 112 of pulse counter 94 is shorted. Resistor 112 is shorted during the search mode when the PRF is high so that the discharge circuit of storage capacitor 104 has a shorter time constant During the track mode, when the PRF is comparatively low, the resistor 112 is not shorted.

The proportional memory circuit 97 will now be described. Its main function is to make the duration of the memory mode proportional to the length of time that the DME has been in the track mode. In the absence of proportional memory, any time that the DME went into the memory mode it would stay in that mode for some fixed period such as ten seconds. Thus, in this example, there would always be an interval of ten seconds before the DME could go into the search mode. With proportional memory the DME will remain in the memory mode for only a short interval, such as two or three seconds, if the DME has been in the track mode for only a short interval. If it has been in the track mode for a comparatively long period and then goes into the memory mode, it will stay in the memory mode for the maximum period which, in the present example is about ten seconds.

It will be seen that the driving of the servo by the velocity memory capacitor 96 is terminated as soon as the K3 relay arm 123 shorts capacitor 96 and connects the search voltage to the lead 124. At this point it may be noted that the search voltage is plus 15 volts as taken from the junction point of voltage divider resistors 133 and 134 when the K1 relay arm 116 is in its upper (energized) position The search voltage applied to lead 124 is substantially less than 15 volts due to the voltage divider action of resistors 121 and 127.

Upon fading or loss of the ground station reply signals, the DME goes from the track-in-range mode to the memory mode as a result of relay K1 being energized. During the memory mode the relays K2 and K3 remain de-energized, the condition shown in FIGS. 1 and 7. Thus, at the start of the memory mode, K1 arm 116 is in the up position applying plus 15 volts to lead 118, and K1 arm 79 (FIG. 6) is down to disconnect the servo from the range error signal. The servo is now being driven by the voltage built up on velocity memory capacitor 96 during the track mode.

Consider now the action of the proportional memory circuit 97 during the two modes preceding the memory mode, namely, the track mode and the acquisition mode (which precedes the track mode). In these two modes the relay K1 is de-energized, its arms being in the position illustrated. Therefore, during these two modes K1 arm 116 is connected to minus 18 volts which is applied over lead 118, through a resistor 136 to the high capacity proportional memory capacitor 137, and from capacitor 137 through a 4.7 K resistor plus to 18 volts. It will be noted that this charging circuit for capacitor 137 has a long time constant, the capacity of 137 being 430 microfarads. It is evident that the longer the DME is in the track mode, the greater the charge acquired by capacitor 137.

As soon as relay K1 is de-energized (i.e., at the start of the acquisition mode) the capacitor 137 starts to charge negatively. In a fraction of a second, capacitor 137 charges negatively enough to turn off a transistor Q16 of the NPN type. This permits an acquisition control capacitor 139 to be charged positively from the plus 18 volt supply through the collector resistor 141 of Q16, capacitor 139 being between the base and grounded collector of a PNP type transistor Q17.

In about 0.75 second, capacitor 139 charges positively enough to turn off the transistor Q17. This results in the turning off of a PNP type transistor Q18. Thus, the relays K2 and K3 are de-energized since they receive their energizing current from the collector of Q18. This interval of about 0.75 second is the acquisition mode period. As soon as relays K2 and K3 are de-energized, the acquisition mode has terminated and the DME is in the track mode. It should be noted that during the acquisition mode period the relays K2 and K3 are energized so that the PRF of the interrogation pulses is high and the time constant of the discharge path for the step-charged capacitor 104 is short.

Referring again to the charging of the proportional memory capacitor 137, this capacitor will continue to charge negatively until its voltage is clamped by a diode 142 at a level determined by a voltage divider comprising resistors 143 and 144 connected between minus 18 volts and ground. Approximately ten seconds are required to reach the clamp voltage. If the DME is in track (and acquisition) for less than ten seconds, the clamp voltage is not reached.

Now consider the proportional memory operation when reply signals are lost so that relay K1 is energized, and the DME goes into the memory mode. The relays K2 and K3 remain de-energized during the memory mode, and are energized at the end of the memory mode as will now be described. With K1 energized, its arm 116 is in the upper position applying plus 15 volts through the lead 118 and resistor 136 to proportional memory capacitor 137. Capacitor 137 is now charged in the opposite direction at approximately the same rate as before. After a period approximately equal to the original charging time (for the negative charging) of capacitor 137, the transistor Q16 is forward biased and conducts. This period is a maximum of about ten seconds, and is a shorter period if the DME is in the track mode for a shorter period. The forward biasing of Q16 energizes relays K2 and K3, the K3 arm shorting the velocity memory capacitor 96, thus ending the memory mode. The energizing of relays K2 and K3 occurs when Q16 is forward biased since conduction of Q16 drives Q17 into conduction. By virtue of Q17 conducting, the voltage divider network 146, 147, 148 places a negative potential of the base of Q18 which turns it on and energizes relays K2 and K3 ending the memory mode. It is evident that the duration of the memory mode is proportional to the length of time the DME is in the track mode, up to a maximum of about ten seconds. Therefore, the DME is allowed to go into the search mode fairly promptly if it has been in the track mode for only a few seconds, such as three or four seconds.

At the end of the memory mode the three relays K1, K2 and K3 are energized and the DME is in the search mode with the search voltage being applied to the lead 124 and thus to the servo pre-amplifier 84 through diode 119, resistors 121 and 122, and K3 arm 123; the resistor 112 of the pulse counter is shorted; and K2 arm 131 has shorted R12 of the countdown generator (FIG. 2) so the PRF is high. Also, K1 arm 117 and K3 arm 129 have grounded the clutch control lead so that the range gate is being driven fast from 0 to 200 miles to locate the ground station reply signal.

When the range gate finds the reply signal (becomes time coincident with it), if three or four reply pulses out of nine or ten successive pulses, for example, get through the range gate, the pulse counter de-energizes K1 and the DME is in the acquisition mode. The range error signal is now being applied to the servo pre-amplifier 84 (FIG. 6), ground has been taken off the clutch control lead 128 so that there is now slow servo drive of the range gate, and the lead 118 (FIG. 7) now applies minus 18 volts to the proportional memory capacitor 137 and to the base of Q16 resulting, after about 0.75 second, in the de-energizing of K2 and K3 as previously explained. The system is now in the track mode.

As shown in FIG. 1, there is a warning flag associated with the range indicator 92. The flag is masked and not visible when the range indicator is presenting a correct range reading as is the case when the DME is in the track mode. When the DME is in search, for example, the flag is pulled from behind the mask by a spring so that an operator is warned that the range indication is not correct.

During the track mode the warning flag is held behind the mask by an energized solenoid 150. The solenoid is energized when a lead 151 is grounded, as it is when the relay K3 (FIG. 7) is de-energized so that the relay arm 129 is in the upper position. This is the condition illustrated, the DME being illustrated as being in the track mode.

The sequence of operation of the DME through its four modes of operation will now be summarized.

I.—*Track mode*

Relays K1, K2 and K3 are de-energized.

The range error signal is being applied to the servo input so that the range motor is driving the distance potentiometer and the resolver to hold the range gate (and the range error ramp) substantially centered with respect to the ground station reply signal so that there is automatic track-in-range.

The DME is in slow servo drive (clutch control lead 128 being ungrounded), and the servo has slow response (capacitor 96 being in the lag-lead network).

The PRF is 30 pulses per second, and the time constant is correspondingly long for the discharge circuit of the step-charged capacitor 104 in pulse counter circuit 94 so that capacitor 104 will hold a charge longer whereby there is less tendency for relay K1 to be momentarily energized.

Meanwhile a velocity memory voltage builds up on velocity memory capacitor 96.

Also, a negative charge is building up on proportional memory capacitor 137.

II.—*Proportional memory mode*

Relay K1 is energized. Relays K2 and K3 remain de-energized.

Upon loss of reply signals, step-charged capacitor 104 of pulse counter 94 loses its charge, K1 is energized, and the DME goes into the proportional memory mode. The duration of this mode is proportional to the time the DME has been in track, and has a maximum period of about ten seconds.

During proportional memory the voltage of velocity memory capacitor 96 is applied to the input of the servo pre-amplifier so that the range gate will continue to move in range at the aircraft's last velocity.

The DME is still in slow servo drive, and the servo still has slow response.

The PRF is still 30 pulses per second, and there is still a long time constant for the discharge circuit of the step-charged capacitor 104.

If, while the DME is still in the memory mode, the reply pulses return reliably enough so that three or four reply pulses out of ten interrogation pulses pass through the range gate, the DME returns to the track mode.

If the reply pulses do not return soon enough, the DME goes into the search mode. It will be about ten seconds before the DME goes into search if the DME has been in track for ten seconds or more. However, the DME will go into search in a shorter time if it has been in track for less than ten seconds. For example, if the DME has been in track for only about four seconds when reply signals are lost, the DME will be in the memory mode for only about four seconds, and will then go into search.

As previously explained, when the DME goes into the memory mode, the de-energizing of K1 connects lead 118 to plus 15 volts, thus starting the discharge of proportional memory capacitor 137. When capacitor 137 discharges to a certain voltage, relays K2 and K3 are energized as previously explained, and the memory mode is terminated. The DME is now in the search mode.

III.—*Search mode*

Relays K1, K2 and K3 are energized.

K3 relay arm 123 has now shorted memory (and lag-lead) capacitor 96, and has connected the D.-C. search voltage through lead 124 to the input of the servo pre-amplifier 84.

The DME is now in fast servo drive (clutch control lead 128 being grounded), and the servo has fast response (capacitor 96 being shorted).

The PRF of the interrogating pulses is now 140 pulses per second, and the time constant for the discharge circuit of the step-charged capacitor 104 is correspondingly short, resistor 112 having been shorted.

The range motor 46 is now driving the distance potentiometer 44 and the resolver 51 so that the range gate is being swept rapidly through the 200-mile range.

When the range gate occurs at the same time as the reception of reply pulses, and if at least three or four reply pulses out of nine or ten successive pulses pass through the range gate, the step-charged capacitor 104 of pulse counter 94 is charged to a voltage that causes K1 to be de-energized. Relays K2 and K3 remain energized. The DME is now in the acquisition mode.

IV.—*Acquisition mode*

Relay K1 is de-energized. Relays K2 and K3 are energized.

The duration of this mode is about 0.75 second.

Range error signal now is being applied to the input of the servo pre-amplifier.

The DME is now in slow servo drive (clutch control lead 128 now being un-grounded), but still has fast servo response since memory and lag-lead capacitor 96 is still shorted.

The PRF is still 140 pulses per second, and there is still the correspondingly short discharge time constant for the step-charged capacitor 104.

If at least three or four reply pulses out of nine or ten interrogation pulses continue to pass through the range gate for the duration of the acquisition mode, the relays K2 and K3 are de-energized at the end of the acquisition mode, and the DME has returned to the track mode.

If less than these three or four reply pulses pass through the range gate during the acquisition mode, the relay K1 is energized, and the DME goes back into the search mode. This switching back into search occurs promptly because of the short discharge time constant of step-charged capacitor 104, resistor 112 being shorted.

By maintaining, during the acquisition mode, a high PRF for the interrogation pulses and a short discharge time constant for the step-charged capacitor 104, the duration of the acquisition mode can be made very short (0.75 second in this example) and still have an acquisition mode that is long enough to insure that the DME is not thrown into track by random pulse pairs that are being continuously transmitted from the ground station, these being referred to as "squitter" pulses. The use of a low PRF, such as a PRF of 30, would require an acquisition mode period of about four seconds to provide equally good insurance against "squitter" pulses throwing the DME into track. Furthermore, with the high PRF and short discharge time constant, the reception of "squitter" pulses usually de-energizes the relay K1 for only a very short interval, such as one-tenth second. This is a much shorter interval than it would be if the PRF were low with a long discharge time constant. The result is that by the use of the high PRF and short discharge time constant during the acquisition period, the DME is promptly thrown back into the search mode following reception of "squitter" pulses that are coincident with the range gate. Thus, the DME searches quickly and locks onto the actual reply pulses without the search process being continually interrupted for intervals that would add up to a very substantial time.

During the acquisition mode the servo has fast response since the lag-lead capacitor 96 is shorted during this mode. It will be remembered that when the DME goes into the acquisition mode, the range error signal is applied to the servo input circuit. The fast servo response provides improved operation because the range error ramp will quickly be moved to a position where it is centered with respect to the reply signal so that when the DME is switched into the track mode the range reading immediately will be the correct reading. The rapid positioning of the range gate in the acquisition mode requires a range servo acceleration capability and fast response not required, or desired during the track and memory mode.

CLUTCH-BRAKE DRIVE

In the example illustrated, the range motor 46 (FIG. 1) drives the distance potentiometer 44 and the resolver 51 through a clutch-brake and gear drive as previously described. This drive is shown in more detail in FIGS. 8 and 9. First referring to the clutch-brake unit, it comprises a rotatable shaft 156 to which is attached a clutch plate 157 and a brake plate 158. The shaft 156 extends through and is rotatably supported by a coaxial shaft 159. Shaft 159 is rotatably supported by the end of a metal housing 161.

One end of the shaft 159 carries a clutch plate 162 which faces the clutch plate 157. The other end of the shaft 159 has a gear wheel 165 attached thereto which is driven by the range motor 46 through gear wheels 163 and 164. The gear 164 has the same number of teeth as the gear 165.

Figure 8:
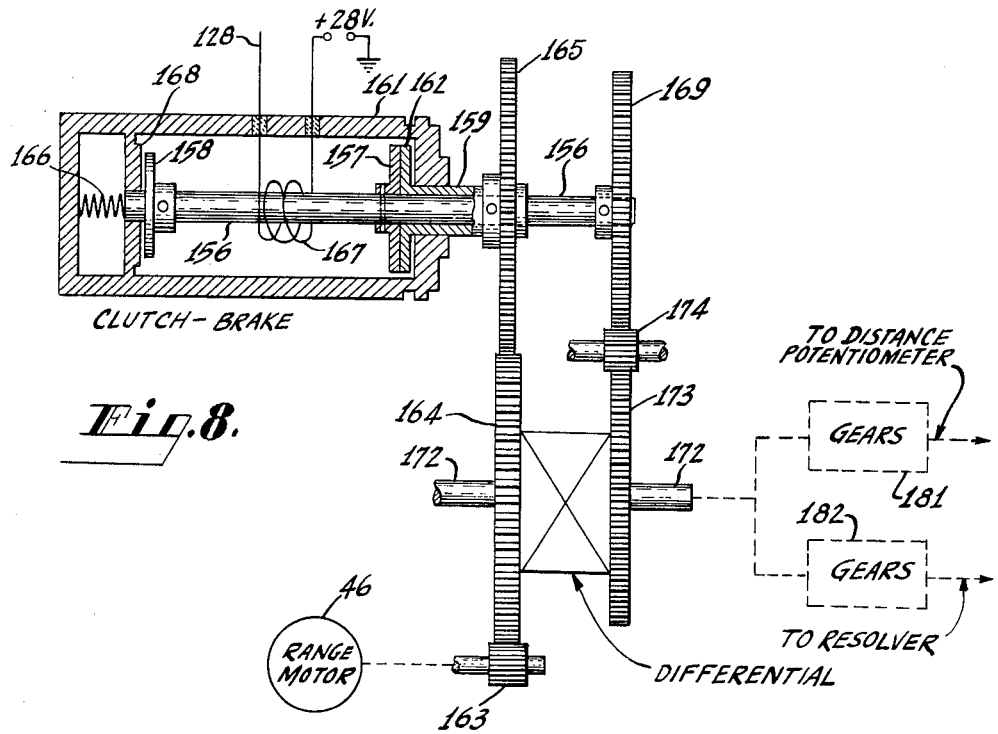
FIG. 8 is a schematic diagram of the clutch-brake and gearing through which the range motor (FIG. 1) drives the ranging units.

As illustrated in FIG. 8, the clutch is engaged due to the action of a spring 166 which forces the shaft 156 to the right, and thus causes the clutch plate 157 to engage the clutch plate 162.

In response to the energizing of a solenoid, indicated schematically by the coil 167, the shaft 156 is pulled to the left, thereby disengaging the clutch 157-162 and stopping the shaft rotation quickly by forcing the brake plate 158 against a brake plate 168 which is attached to the housing 161. It will be seen that when the solenoid 167 is de-energized (the clutch engaged), the range motor 46 drives the shaft 156 and a gear wheel 169 attached thereto; and that when the solenoid 167 is energized, the clutch is disengaged and the brake is applied so that the rotation of the shaft 156 is quickly stopped.

Figure 9:
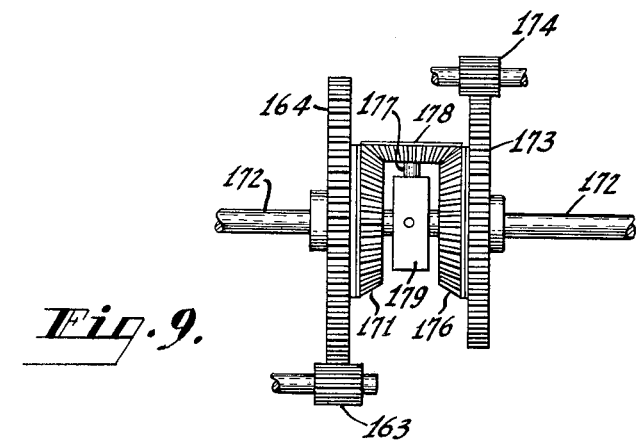
FIG. 9 is a schematic diagram illustrating the differential unit incorporated in the gearing shown in FIG. 8.

As shown in FIG. 9, the gear wheel 164 is fastened to the bevel gear 171 of a differential. The gears 164 and 171 are rotatable about a differential shaft 172. A gear wheel 173 is driven through an idler gear 174 by the gear wheel 169 (FIG. 8). The gear 173 has a different number of teeth than the gear 169. In the example described it is a difference of one tooth, the gear 173 having 61 teeth and the gear 169 having 60 teeth. The gear 173 is fastened to the bevel gear 176 of the differential, and both gears are rotatable about the differential shaft 172.

The bevel gears 171 and 176 mesh with a bevel gear 178 which is rotatable about a supporting shaft 177. The shaft 177 is mounted on a supporting block 179 which is fastened to the differential shaft 172.

It will be apparent that, in operation, if the gear wheel 173 is held stationary (the brake on) while the gear wheel 164 is being driven, the bevel gear 171 will drive the bevel gear 178 around the bevel gear 176 and rotate the shaft 172 at a comparatively fast rotation.

Comparatively slow rotation of the shaft 172 is obtained when the clutch is engaged so that both the gear 173 and the gear 164 are rotating. Because of the idler gear 174, the gears 173 and 164, and bevel gears 176 and 171) rotate in opposite directions; and because of the one tooth difference in gears 169 and 173 they rotate at slightly different speds. Thus, the shaft 172 is rotated at a comparatively slow speed.

It will be noted that the shaft 172 drives the distance potentiometer 44 through gears 181 (FIG. 8) and that it drives the resolver 51 through gears 182. The gearing is such that the resolver rotor is rotated ten times for each single rotation of the potentiometer arm.

As previously explained, in the search mode the clutch control lead 128 (FIG. 1) is grounded so that the clutch is disengaged, the brake is on, and the DME is in fast servo drive; that is, the range motor 46 drives the range units 44 and 51 at the high speed. As soon as the range gate becomes coincident with the reply pulses and sufficient reply pulses pass through the range gate, the lead 128 is ungrounded so that the solenoid 167 is de-energized. The result is that the clutch is very quickly engaged by action of the spring 166 to put the DME in slow servo drive. Thus, the DME is in slow servo drive during the acquisition mode. It is also in slow servo drive during the track and proportional memory modes.

When, during search, the range gate becomes coincident with the reply pulses, it must be stopped very rapidly, i.e., switched very quickly to the slow drive so that there will be a lock-on for automatic track. During the search mode the range gate is being driven very rapidly, the gate travel rate being at forty miles per second or about 500 microseconds per second. The gate width of 34 microseconds is wide enough to allow three or four out of nine or ten successive reply pulses, for example, to pass through the range gate before it has time to move out of coincidence. Also, the system switches to slow servo drive fast enough so that the range gate is not driven out of coincidence with reply pulses before the system can lock on to the reply pulses. In the example described, the stopping time for the range servo, i.e., the time for shifting from fast servo drive to slow servo drive, is not greater than three milliseconds.

What is claimed is:

1. In combination, means for generating a timing signal of repetitively recurring wave form, each cycle of which has a sloping portion, means for frequency dividing said signal for producing a lower-frequency signal having a repetition frequency that is a submultiple of the frequency of said timing signal, means for producing gate pulses recurring at said submultiple frequency and in synchronism with said lower-frequency signal, pulse generator means for producing a pulse in response to said sloping portion in each cycle of said timing signal reaching a certain instantaneous voltage value as it changes value in a certain direction, a gate, means for applying to said gate the pulses from said pulse generator, and means for applying said gate pulses to said gate to pass through the gate the pulse generator pulses that are coincident with said gate pulses so that the output of said gate consists of pulse generator pulses that recur at said submultiple frequency.

2. In combination, means for producing a sine wave signal, means for frequency dividing said signal for producing a lower-frequency signal having a repetition frequency that is a submultiple of the frequency of said sine wave signal, means for producing gate pulses recurring at said submultiple frequency and in synchronism with said lower-frequency signal, pulse generator means for producing a pulse in response to each cycle of said sine wave reaching a certain instantaneous voltage value as it changes value in a certain direction, a gate, means for applying to said gate the pulses from said pulse generator, and means for applying said gate pulses to said gate to pass through the gate the pulse generator pulses that are coincident with said gate pulses so that the output of said gate consists of pulse generator pulses that recur at said submultiple frequency.

3. In combination, means for generating a timing signal of repetitively recurring wave form, each cycle of which has a sloping portion, means for frequency dividing said signal for producing a lower-frequency signal having a repetition frequency that is a submultiple of the frequency of said timing signal, means for producing gate pulses recurring at said submultiple frequency and in synchronism with said lower-frequency signal, a first pulse generator means for producing a pulse in response to said sloping portion in each cycle of said timing signal reaching a certain instantaneous voltage value as it changes value in a certain direction, a second pulse generator means for producing a pulse in response to said sloping portion in each cycle of said timing signal reaching a different instantaneous voltage value as it changes value in a certain direction, a first gate and a second gate, means for applying to said gates the pulses from said first and second pulse generators, respectively, and means for applying said gate pulses to said gates to pass through the gates the pulse generator pulses that are coincident with said gate pulses so that the output of each of said gates consists of pulse generator pulses that recur at said submultiple frequency, the output pulses from one gate being time spaced with respect to the pulses from the other gate.

4. In combination, means for generating a timing signal of repetitively recurring wave form, each cycle of which has a sloping portion, means for frequency dividing said signal for producing a lower-frequency signal having a repetition frequency that is a submultiple of the frequency of said timing signal, means for producing gate pulses recurring at said submultiple frequency and in synchronism with said lower-frequency signal, first pulse generator means for producing a pulse in response to said sloping portion in each cycle of said timing signal reaching a certain instantaneous voltage value as it changes value in a certain direction, a second pulse generator means for producing a pulse in response to said sloping portion in each cycle of said timing signal reaching a different instantaneous voltage value as it changes value in a certain direction, a first gate and a second gate, means for applying to said gates the pulses from said first and second pulse generators, respectively, and means for applying said gate pulses to said gates to pass through the gates the pulse generator pulses that are coincident with said gate pulses so that the output of each of said gates consists of pulse generator pulses that recur at said submultiple frequency, the output pulses from one gate being time spaced with respect to the pulses from the other gate, a utilization device, connections from said gates to said utilization device through which the outputs of said gates may be supplied to said utilization device, and selector switch means for determining whether the output of one of said gates is or is not supplied to said utilization device.

5. In combination, means for generating a timing signal of repetitively recurring wave form, each cycle of which has a sloping portion, means for frequency dividing said signal for producing a lower-frequency signal having a repetition frequency that is a submultiple of the frequency of said timing signal, means for producing gate pulses recurring at said submultiple frequency and in synchronism with said lower-frequency signal, first pulse generator means for producing a pulse in response to said sloping portion in each cycle of said timing signal reaching a certain instantaneous voltage value as it changes value in a certain direction, a second pulse generator means for producing a pulse in response to said sloping portion in each cycle of said timing signal reaching a different instantaneous voltage value as it changes value in a certain direction, a third pulse generator means for producing a pulse in response to said sloping portion in each cycle of said timing signal reaching a still different instantaneous voltage value as it changes value in a certain direction, a first gate, a second gate and a third gate, means for applying to said gates the pulses from said first, second and third pulse generators, respectively, and means for applying said gate pulses to said gates to pass through the gates the pulse generator pulses that are coincident with said gate pulses so that the output of each of said gates consists of pulse generator pulses that recur at said submultiple frequency, the output pulses from each gate being time spaced with respect to the pulses from each of the other gates, a utilization device, connections from said gates to said utilization device through which the outputs of said gates may be supplied to said utilization device, and selector switch means for selecting the output of one or more of said gates and supplying them to said utilization device.

6. In combination, means for generating a timing signal of repetitively recurring wave form, each cycle of which has a sloping portion, means for frequency dividing said signal for producing a lower-frequency signal having a repetition frequency that is a submultiple of the frequency of said timing signal, means for producing gate pulses recurring at said submultiple frequency and in synchronism with said lower-frequency signal, first pulse generator means for producing a pulse in response to said sloping portion in each cycle of said timing signal reaching a certain instantaneous voltage value as it changes value in a certain direction, a second pulse generator means for producing a pulse in response to said sloping portion in each cycle of said timing signal reaching a different instantaneous voltage value as it changes value in a certain direction, a third pulse generator means for producing a pulse in response to said sloping portion in each cycle of said timing signal reaching a still different instantaneous voltage value as it changes value in a certain direction, a first gate, a second gate and a third gate, means for applying to said gates the pulses from said first, second and third pulse generators, respectively, and means for applying said gate pulses to said gates to pass through the gates the pulse generator pulses that are coincident with said gate pulses so that the output of each of said gates consists of pulse generator pulses that recur at said submultiple frequency, the output pulses from each gate being time spaced with respect to the pulses from each of the other gates, a utilization device, connections from said gates to said utilization device through which the outputs of said gates may be supplied to said utilization device, and selector switch means for determining which one of two gate outputs is supplied to said utilization device.

7. In combination, means for generating a timing signal of repetitively recurring wave form, each cycle of which has a sloping portion, frequency dividing and pulse generating means for counting down said signal and producing a repetitively recurring pulse having a repetition frequency that is a submultiple of the frequency of said timing signal, means for producing gate pulses recurring at said submultiple frequency and in synchronism with said repetitively recurring pulse, a first pulse generator means for producing a pulse in response to said sloping portion in each cycle of said timing signal reaching a certain instantaneous voltage value as it changes value in a certain direction, said certain instantaneous voltage being such that the pulses from said first pulse generator have a certain time spacing with respect to said repetitively recurring pulse, a second pulse generator means for producing a pulse in response to said sloping portion in each cycle of said timing signal reaching a different instantaneous voltage value as it changes value in a certain direction whereby the pulses from said second pulse generator are time spaced with respect to the pulses from said first pulse generator, a first gate and a second gate, means for applying to said first and second gates the pulses from said first and second pulse generators, respectively, and means for applying said gate pulses to said gates to pass through the gates the pulse generator pulses that are coincident with said gate pulses so that the output of each of said gates consists of pulse generator pulses that recur at said submultiple frequency.

8. In combination, means for generating a timing signal of repetitively recurring wave form, each cycle of which has a sloping portion, frequency dividing and pulse generating means for counting down said signal and producing a train of repetitively recurring pulses having a repetition frequency that is a submultiple of the frequency of said timing signal, means for producing gate pulses recurring at said submultiple frequency and in synchronism with said repetitively recurring pulses, a first pulse generator means for producing a pulse in response to said sloping portion in each cycle of said timing signal reaching a certain instantaneous voltage value as it changes value in a certain direction, said certain instantaneous voltage being such that the pulses from said first pulse generator have a certain time spacing with respect to said repetitively recurring pulses, a second pulse generator means for producing a pulse in response to said sloping portion in each cycle of said timing signal reaching a different instantaneous voltage value as it changes value in a certain direction whereby the pulses from said second pulse generator are time spaced with respect to the pulses from said first pulse generator, a first gate and a second gate, means for applying to said first and second gates the pulses from said first and second pulse generators, respectively, means for applying said gate pulses to said gates to pass through the gates the pulse generator pulses that are coincident with said gate pulses so that the output of each of said gates consists of a train of pulses that recur at said submultiple frequency, a utilization device, and means for selectively supplying to said utilization device only two of said trains of repetitively recurring submultiple frequency pulses whereby there is obtained pairs of time spaced pulses having a selected time spacing.

9. A code pulse generator for DME comprising in combination, means for generating a timing signal of repetitively recurring wave form, each cycle of which has a sloping portion, frequency dividing and pulse generating means for counting down said signal and producing a train of repetitively recurring pulses having a repetition frequency that is a submultiple of the frequency of said timing signal, means for producing gate pulses recurring at said submultiple frequency and in synchronism with said repetitively recurring pulses, a first pulse generator means for producing a pulse in response to said sloping portion in each cycle of said timing signal reaching a certain instantaneous voltage value as it changes value in a certain direction, said certain instantaneous voltage being such that the pulses from said first pulse generator have a certain time spacing with respect to said repetitively recurring pulses and occur subsequent thereto, a second pulse generator means for producing a pulse in response to said sloping portion in each cycle of said timing signal reaching a different instantaneous voltage value as it changes value in a certain direction whereby the pulses from said second pulse generator are time spaced with respect to the pulses from said first pulse generator and occur subsequent thereto, a first gate and a second gate, means for applying to said first and second gates the pulses from said first and second pulse generators, respectively, means for applying said gate pulses to said gates to pass through the gates the pulse generator pulses that are coincident with said gate pulses so that the output of each of said gates consists of a train of pulses that recur at said submultiple frequency, a utilization device, means for supplying the train of pulses from said second gate to said utilization device, and means for selectively supplying to said utilization device one of the other of said trains of repetitively recurring submultiple frequency pulses so that pairs of time spaced pulses having a selected time spacing are present at said utilization device, and means for utilizing the train of pulses from said second gate as the time reference pulses for the DME distance measurement.

10. In combination, means for generating a timing signal of repetitively recurring wave form, each cycle of which has a sloping portion, frequency dividing and pulse generating means for counting down said signal and producing a train of repetitively recurring pulses having a repetition frequency that is a submultiple of the frequency of said timing signal, means for producing gate pulses recurring at said submultiple frequency and in synchronism with said repetitively recurring pulses, a plurality of pulse generator means each for producing a pulse in response to said sloping portion in each cycle of said timing signal reaching a certain instantaneous voltage value as it changes value in a certain direction, said certain instantaneous voltage being different for each of said pulse generator means and being such that the pulses from each of said pulse generator means have a certain time spacing with respect to said repetitively recurring pulses and with respect to the pulses from the other pulse generator means, a plurality of gates, means for applying to said gates the pulses from each of said pulse generator means, respectively, means for applying said gate pulses to said gates to pass through the gates the pulse generator pulses that are coincident with said gate pulses so that the output of each of said gates consists of a train of pulses that recur at said submultiple frequency, and means for selectively supplying to a utilization device at least two of said trains of repetitively recurring submultiple frequency pulses whereby there are supplied to said utilization device groups of time spaced pulses, the pulses in each group having a selected time spacing.

11. In combination, means for generating a sine wave signal, each cycle of said sine wave having a sloping portion, pulse generator means for producing a pulse in response to said sloping portion in each cycle of said sine wave reaching a certain instantaneous voltage value as it changes value in a certain direction, said pulse generator means comprising: a transistor of the PNP type having a base, an emitter and a collector, an output resistor through which an operating voltage is applied to said collector, means applying a negative bias voltage to said emitter, a diode connected to apply said sine wave signal to said base, said diode being connected in the direction to conduct during the portion of the sine wave cycle that is more positive than said bias voltage whereby said base is raised positive with respect to said emitter during said diode conduction, and means applying to said base a negative bias voltage of sufficient value to drive said transistor to saturation during that portion of a sine wave cycle that the sine wave is sufficiently negative to back bias said diode whereby a transistor output pulse appears at said output resistor while said diode is back biased, means for differentiating said output pulse to produce a trigger pulse occurring at its back edge, a pulse producing oscillator, and circuit means applying said trigger pulse to said oscillator for triggering said oscillator by said trigger pulse.

12. In combination, means for generating a timing signal of repetitively recurring wave form, each cycle of which has a sloping portion, pulse generator means for producing a pulse in response to said sloping portion in each cycle of said timing signal reaching a certain instantaneous voltage value as it changes value in a certain direction, said pulse generator means comprising: a transistor of the PNP type having a base, an emitter and a collector, an output resistor through which an operating voltage is applied to said collector, means applying a negative bias voltage to said emitter, a diode connected to apply said timing signal to said base, said diode being connected in the direction to conduct during the portion of a timing signal cycle that is more positive than said bias voltage whereby said base is raised positive with respect to said emitter during said diode conduction, and means applying to said base a negative bias voltage of sufficient value to drive said transistor to saturation during that portion of a timing wave cycle that the timing wave is sufficiently negative to back bias said diode whereby a transistor output pulse appears at said output resistor while said diode is back biased, a pulse producing oscillator, and means for triggering said oscillator by an edge of said output pulse.

13. In combination, means for generating a timing signal of repetitively recurring wave form, each cycle of which has a sloping portion, means for frequency dividing said signal for producing a lower-frequency signal having a repetition frequency that is a submultiple of the frequency of said timing signal, means for producing gate pulses recurring at said submultiple frequency and in synchronism with said lower-frequency signal, means for jittering said gate pulses by a discrete amount that is equal to an integral multiple of the repetition period of said timing signal, first pulse generator means for producing a pulse in response to said sloping portion in each cycle of said timing signal reaching a certain instantaneous voltage value as it changes value in a certain direction, a second pulse generator means for producing a pulse in response to said sloping portion in each cycle of said timing signal reaching a different instantaneous voltage value as it changes value in a certain direction, a first gate and a second gate, means for applying to said gates the pulses from said first and second pulse generators, respectively, and means for applying said gate pulses to said gates to pass through the gates the pulse generator pulses that are coincident with said gate pulses so that the output of each of said gates consists of pulse generator pulses that recur at said submultiple frequency, the output pulses from one gate being time spaced with respect to the pulses from the other gate.

14. Distance measuring equipment comprising means for generating and transmitting interrogation pulses and means for receiving reply pulses in response to transmission of said interrogation pulses, and further comprising means for producing a range gate pulse that is shiftable in time with respect to an interrogation pulse to range gate the received pulses, and a ranging unit responsive to the range gate pulse and the received pulses for controlling the timing of said range gate, said means for generating said interrogation pulses comprising: means for generating a timing signal of repetitively recurring wave form, each cycle of which has a sloping portion, means for frequency dividing said signal for producing a lower-frequency signal having a repetition frequency that is a submultiple of the frequency of said timing signal, means for producing gate pulses recurring at said submultiple frequency and in synchronism with said lower-frequency signal, first pulse generator means for producing a pulse in response to said sloping portion in each cycle of said timing signal reaching a certain instantaneous voltage value as it changes value in a certain direction, a second pulse generator means for producing a pulse in response to said sloping portion in each cycle of said timing signal reaching a different instantaneous voltage value as it changes value in a certain direction, a first gate and a second gate, means for applying to said gates the pulses from said first and second pulse generators, respectively, and means for applying said gate pulses to said gates to pass through the gates the pulse generator pulses that are coincident with said gate pulses so that the output of each of said gates consists of pulse generator pulses that recur at said submultiple frequency, the output pulses from one gate being time spaced with respect to the output pulses from the other gate, a pulse shaper, connections from said gates to said pulse shaper through which the outputs of said gates may be supplied to said pulse shaper, selector switch means for determining whether the output of one of said gates is or is not supplied to said pulse shaper; the output of said pulse shaper being applied to said transmitting means whereby said pulse shaper output pulses are the transmitted interrogation pulses; said ranging unit including a resolver, means supplying said timing signal to said resolver, range driving means for driving said ranging unit to shift the timing of the output signal of said resolver and thereby shift the timing of said range gate.

15. Distance measuring equipment comprising means for generating and transmitting interrogation pulses and means for receiving reply pulses in response to transmission of said interrogation pulses, said means for generating said interrogation pulses comprising: means for generating a timing signal of repetitively recurring wave form, each cycle of which has a sloping portion, means for frequency dividing said signal for producing a lower-frequency signal having a repetition frequency that is a submultiple of the frequency of said timing signal, means for producing gate pulses recurring at said submultiple frequency and in synchronism with said lower-frequency signal, first pulse generator means for producing a pulse in response to said sloping portion in each cycle of said timing signal reaching a certain instantaneous voltage value as it changes value in a certain direction, a second pulse generator means for producing a pulse in response to said sloping portion in each cycle of said timing signal reaching a different instantaneous voltage value as it changes value in a certain direction, a first gate and a second gate, means for applying to said gates the pulses from said first and second pulse generators, respectively, and means for applying said gate pulses to said gates to pass through the gates the pulse generator pulses that are coincident with said gate pulses so that the output of each of said gates consists of a train of pulses that recur at said submultiple frequency, the output pulses from one gate being time spaced with respect to the output pulses from the other gate, means for supplying a third train of pulses that recur at said submultiple frequency which are time spaced with respect to the pulses in the other two trains of pulses, a pulse shaper, means supplying one of said trains of pulses to said pulse shaper, connections over which the other two trains of pulses may be supplied to said pulse shaper, selector switch means for making only one of said connections effective to pass a selected train of pulses to said pulse shaper; and means for utilizing said one train of pulses as the time reference pulses for the distance measurement, the output of said pulse shaper being applied to said transmitting means whereby said pulse shaper output pulses are the transmitted interrogation pulses.

No references cited.

CHESTER L. JUSTUS, *Primary Examiner.*

T. H. TUBBESING, *Assistant Examiner.*